United States Patent
Goettl

(12)
(10) Patent No.: US 6,386,424 B1
(45) Date of Patent: May 14, 2002

(54) APPARATUS FOR MAKING ROOF FLASHING UNITS AND METHOD OF MAKING THE UNITS

(76) Inventor: George M. Goettl, 4329 E. Highland Dr., Paradise Valley, AZ (US) 85253

( * ) Notice: Subject to any disclaimer, the term of this patent is extended or adjusted under 35 U.S.C. 154(b) by 43 days.

(21) Appl. No.: 09/703,569

(22) Filed: Nov. 1, 2000

(51) Int. Cl.[7] .......................... B23K 20/10; B23K 1/06; B23K 37/04
(52) U.S. Cl. .................... 228/110.1; 228/1.1; 228/17.5; 228/144; 228/173.6
(58) Field of Search .............................. 228/1.1, 110.1, 228/129, 130, 144, 145, 146, 173.4, 173.6, 17, 17.5, 17.7

(56) References Cited

U.S. PATENT DOCUMENTS

| | | | |
|---|---|---|---|
| 3,552,629 A | * | 1/1971 | Armbruster et al. |
| 3,856,891 A | * | 12/1974 | West et al. |
| 4,227,959 A | * | 10/1980 | Brown |
| 4,427,485 A | * | 1/1984 | Kutnyak et al. |
| 4,878,985 A | * | 11/1989 | Thomsen et al. |
| 4,965,971 A | * | 10/1990 | Jean-Jacques et al. |
| 5,272,855 A | * | 12/1993 | Togi et al. |
| 5,400,568 A | * | 3/1995 | Kanemitsu et al. |
| 5,479,753 A | * | 1/1996 | Williams |
| 5,535,558 A | * | 7/1996 | Rieke et al. |
| 5,583,292 A | * | 12/1996 | Karbach et al. |
| 5,603,790 A | * | 2/1997 | Rhodes |
| 5,779,902 A | * | 7/1998 | Zuk, Jr. |
| 5,827,387 A | * | 10/1998 | Reynolds et al. |
| 5,888,639 A | * | 3/1999 | Green et al. |
| 5,890,960 A | * | 4/1999 | Cronan et al. |
| 5,902,432 A | * | 5/1999 | Coulton et al. |
| 6,195,948 B1 | * | 3/2001 | Lamanna |
| 6,233,887 B1 | * | 5/2001 | Smith |
| 6,260,315 B1 | * | 7/2001 | Smith |

FOREIGN PATENT DOCUMENTS

| | | | |
|---|---|---|---|
| DE | 3508122 A1 | * | 9/1986 |
| DE | 3719083 C1 | * | 9/1988 |
| DE | 4109625 A1 | * | 9/1992 |
| GB | 2188280 A | * | 9/1987 |

OTHER PUBLICATIONS

US 2001/0040014 A1 Green et al. (Nov. 15, 2001).*

* cited by examiner

*Primary Examiner*—Tom Dunn
*Assistant Examiner*—Kiley Stoner
(74) *Attorney, Agent, or Firm*—H. Gordon Shields

(57) ABSTRACT

Ultrasonic welding apparatus is used for making roof flashing units. The roof flashing unites typically include a generally flat aluminum plate and a cylindrical aluminum element joined to the generally flat plate. Two ultrasonic welders are used to make the roof flashing unit, including a horizontally disposed ultrasonic welder for the cylindrical element and a horizontally disposed ultrasonic welder for joining the cylindrical unit to the generally flat plate.

14 Claims, 3 Drawing Sheets

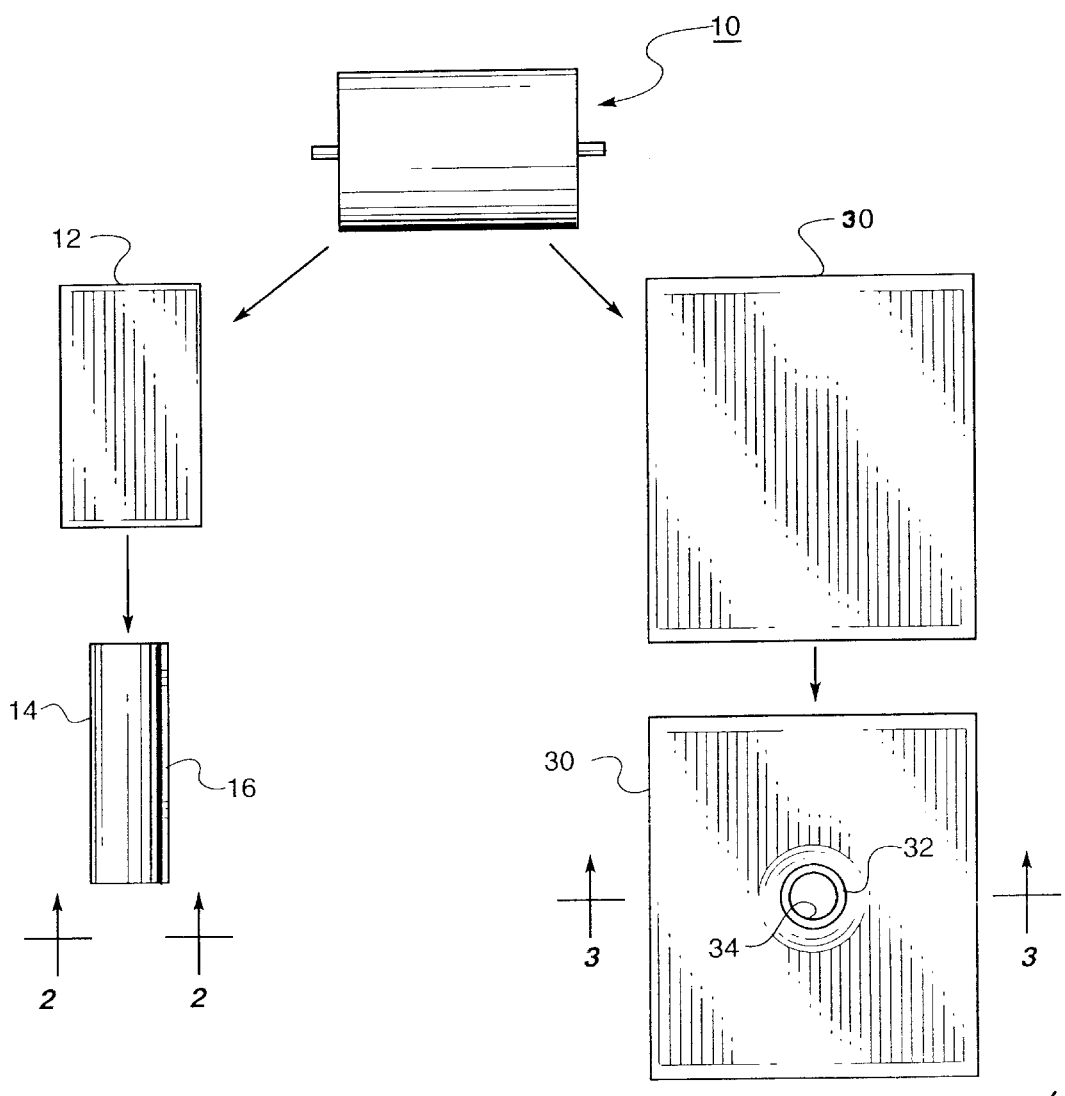
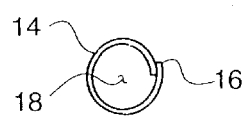
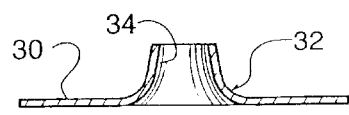
FIG. 1.
FIG. 2.
FIG. 3.

APPARATUS FOR MAKING ROOF FLASHING UNITS AND METHOD OF MAKING THE UNITS

BACKGROUND OF THE INVENTION

1. Field of the Invention

This invention relates to roof flashing units and both the apparatus and method of making them and, more particularly, to the use of ultrasonic welding apparatus for making the roof flashing units.

2. Description of the Prior Art

The use of ultrasonic welding is well known and understood in the art of joining materials. Ultrasonic welding apparatus has been used to join sheet material, as illustrated in U.S. Pat. No. 4,208,001 (Martner), U.S. Pat. No. 4,525,233 (Brooks), and U.S. Pat. No. 4,737,213 (Paeglis and Hinckley). Ultrasonic welding apparatus and techniques have also been used to weld window frames, as illustrated in U.S. Pat. No. 4,856,230 (Slocum) and U.S. Pat. No. 5,105,581 (Slocum, Jr.).

U.S. Pat. No. 5,846,377 (Frantz et al) is a patent which refers to the welding of thermoplastic elements.

U.S. Pat. No. 5,902,657 (Hanson) discloses the use of ultrasonic welding for making window and door joints.

Roof flashing units of the prior art are typically made of aluminum and use rivets to secure their seams. There are also mechanical overlap seams. However, the seams always have leaked, and the need for caulking was obvious. However, caulking cannot be used for flat roofs, where heat from hot asphalt being applied melts the caulk. Roof flashing units include a cylinder secured to a flat plate, and both the seam of the cylinder and the seam required to secure the cylinder to the flat base plate cause leakage problems over time with respect to the caulk.

There are generally three types of roof flashing units, a pipe jack type, which typically goes over sewer pipes extending upwardly from the roof. A second roof flashing type is pipe flashing which typically is disposed over the flue of a gas burning appliance, such as type B gas appliances, namely hot water heaters, gas furnaces, etc. The third type of roof flashing units is the tee top. These units go over or about flues from fans which blow air out of houses, such as exhaust fans, where no heat is involved, and the like.

Pipe jacks generally include a base element and a pipe which extends generally perpendicular to the base element.

Pipe flashing units typically include a base unit and a pipe which is larger than the pipe jack and which typically includes a slant or taper of some type. The pipe element is secured to the base element.

A tee top includes a base unit, a pipe which may or may not have a slant to it, and a curved half cylinder panel secured to the top of the pipe to prevent rain from flowing downwardly.

The method and apparatus comprising the present invention is capable of making all three types of roof flashing units.

With the apparatus and method of the present invention, aluminum roof flashing units are ultrasonically welded, and thus the problem of the riveted seams, or the other type of seams is substantially eliminated. The tubular or cylindrical pipe element is secured to the flat base element by means of ultrasonic welding, thus allowing the roof flashing units to be used on both flat roofs and on sloping roofs.

SUMMARY OF THE INVENTION

The invention described and claimed herein includes a method for ultrasonically welding a pipe element, and for securing the ultrasonically welded pipe element to a base plate. When the pipe element and the base plate are ultrasonically welded together, a roof flashing unit is completed. The roof flashing unit is typically made of aluminum, and the aluminum parts or elements are ultrasonically welded by two ultrasonic welding units or apparatus. The two ultrasonic welders include an anvil element which is freely rotating but does move perpendicular to its rotation axis, and a horn unit against which the aluminum material is disposed and against which the aluminum is pressed during the ultrasonic welding procedure. The ultrasonic welding apparatus for ultrasonically welding the tubular element is generally horizontally disposed, while the ultrasonic welding apparatus for joining the cylindrical pipe element to the base plate is generally vertically oriented.

Among the objects of the present invention are the following:

To provide new and useful roof flashing units which are ultrasonically welded;

To provide new and useful aluminum roof flashing units;

To provide a pair of ultrasonic welders for welding roof flashing units;

To provide an ultrasonic welder for welding a tubular aluminum element;

To provide a ultrasonic welder for joining a flat base plate to a tubular pipe member; and To provide new and useful apparatus for ultrasonically welding roof flashing units.

BRIEF DESCRIPTION OF THE DRAWING

FIG. 1 is a schematic flow diagram illustrating the beginning steps of the method of the present invention.

FIG. 2 is an end view taken generally along line 2—2 of FIG. 1.

FIG. 3 is a view in partial section taken generally along line 3—3 of FIG. 1.

DESCRIPTION OF THE PREFERRED EMBODIMENT

Figure 4:
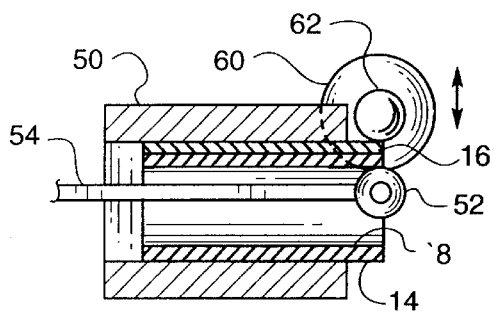
FIG. 4 is a side view in partial section illustrating a step in the method of the present invention.

FIG. 1 is a schematic illustration showing the beginning steps of the method of the present invention. The method of the present invention involves the ultrasonic welding of two elements to form a roof flashing unit. Illustratively, a pipe jack will be discussed. The pipe jack includes two elements, a cylindrical pipe and a generally flat base element. Those two elements are illustrated in FIG. 1.

FIG. 1 illustrates a roll of raw material, for example aluminum, from which are made two flat plates, including a generally rectangular plate 12 and a generally square plate 30. The rectangular plate 12 is rolled into a tubular configuration or pipe 14, with an overlapped area 16 of the aluminum material.

The plate 30, which comprises a base plate, is first placed in a machine which punches a hole 34 and draws an area 32 in the plate 30 about the punched hole 34. The drawn area extends generally upwardly and inwardly from the generally flat plate 30 and towards the hole 34. This allows for overlap for securing the pipe 14 to the base 30 and the inward and upward taper 32 allows for a tight fit of the pipe 14, as will be discussed below.

FIG. 2 is an end view of the pipe 14 of FIG. 1 showing the overlap area 16 and the generally cylindrical open area 18 within the pipe roll 14. FIG. 3 is a view in partial section through the base plate 30 of FIG. 1, showing the drawn area 32 and the hole or aperture 34 extending in the base plate 30.

FIG. 4 is a side view in partial section illustrating the ultrasonic welding of the pipe 14. The pipe 14 is placed in a fixed sleeve 50 with the overlapped area 16, at which the ultrasonic welding will take place, disposed against an anvil 52. The anvil 52 is fixed in place and is connected to and supported by an anvil support arm 54. The anvil 52 freely rotates but does not move laterally.

An ultrasonic unit 60 is disposed adjacent to the sleeve 50 and to the pipe 14. At the front of the ultrasonic welding unit 60 is a horn or head 62, appropriately aligned with the anvil 52. The ultrasonic welding unit 60 moves upwardly for releasing the pipe 14 and for the insertion of a rolled pipe element 14 into the sleeve 50, and then downwardly such that the head 62 essentially clamps the overlapped area 16 of the pipe roll 14 against the fixed anvil 52.

As the welder 60 is actuated, ultrasonic welding takes place at the overlap area 16 to ultrasonically weld the pipe 14. Reference number 20 in FIGS. 5 and 6 denotes the ultrasonic weld for the new finished pipe 14. The anvil 52 rotates freely to help move the pipe 14 out of the sleeve 50 during the welding step. The purpose of the sleeve 50 is to insure the cylindrical configuration of the pipe 14 as the ultrasonic welding takes place. The horn 62 rotates to move the pipe 14 as it vibrates to accomplish the ultrasonic welding.

Figure 5:
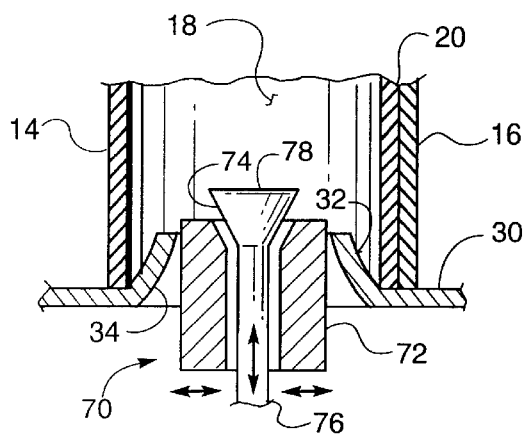
FIG. 5 is a view in partial section illustrating another sequential step in the method of the present invention.

After the pipe 14 is welded at the overlap area 16, the pipe 14 is placed over the drawn area 32 of the base panel 30. This is shown in FIG. 5. The two elements, the pipe 14 and the base panel or plate 30, are then placed on a swage unit 70. FIG. 5 schematically illustrates the swage unit 70, the base plate 30, and the pipe 14.

The swage unit 70, as is well known and understood, includes a plurality of blocks 72 which are generally circularly disposed, and which extend radially outwardly from a central open area. Each of the generally rectangular swage unit blocks 72 includes a inner tapered portion 74. A stem 76 extends downwardly through the center open area of the blocks 72. At the top of the stem 74 is an inverted conical head 78. The diameter at the top of the inverted conical head 78 is larger than the diameter of the open area at the center of the blocks 72. Accordingly, when the stem 76 is moved downwardly, as by appropriate force, such as pneumatic or hydraulic pressure, well known and understood in the art, the inverted conically tapered lower portion of the head 78 contacts the sloping portion 74 of the blocks and moves the blocks outwardly by cam action.

The diameter of the hole or aperture 34 of the plate 30 is slightly larger than the outer diameter of the blocks 72 of the swage unit 70. The plate 30, with the pipe 40 disposed thereon, accordingly is disposed over the swage unit 70.

Figure 6:
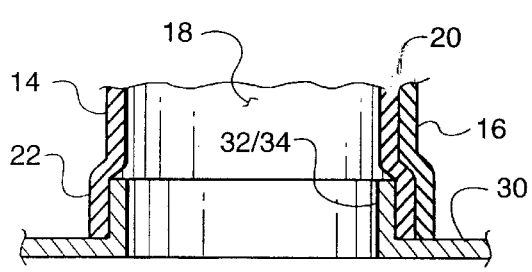
FIG. 6 is a view in partial section sequentially following the step of FIG. 5. Illustrating the result of the step illustrated in FIG. 5.

FIG. 6 sequentially schematically illustrates the result of the action of the swage unit 70 with respect to the base plate 30 and the pipe 14. The blocks 72 move radially outwardly as the stem 76 moves downwardly, and the drawn area 32 moves outwardly against the pipe unit 14 under the pressure or force of the blocks 72. The outward movement of the blocks 72 of the swage unit 70 moves the drawn area 32 outwardly until the drawn area 32 and the hole or aperture 34 are substantially identical and are generally perpendicular to the plane of the base 30. At the same time, the lower portion of the pipe 14 is also moved outwardly slightly and there is accordingly a frictional engagement between the pipe 14 and the base 30. As illustrated in FIG. 6, a joint area 22 of the pipe 14 is disposed against the drawn area 32 to provide the frictional engagement. The joint area 22 is also, of course.

Figure 7:
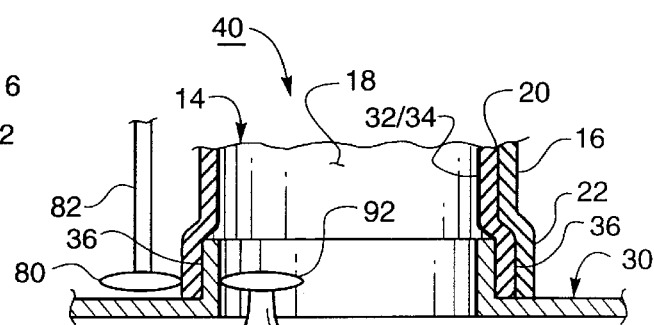
FIG. 7 is a side view in partial section sequentially following FIG. 6 illustrating another step in the method of the present invention.
Figure 8:
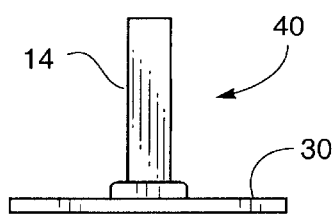
FIG. 8 is a side view illustrating the product made by the method of the present invention.

FIG. 7 is a view in partial section illustrating the ultrasonic welding of the pipe 14 to the drawn area 32 of the base 30. The ultrasonic welding of the pipe 14 to the base 30 completes the fabrication of a pipe jack 40, which is shown in FIG. 8. In FIG. 7, the base 30 with the pipe 14 frictionally engaged thereto is shown disposed against a rotatable anvil 80 at the now adjacently disposed areas of the pipe 14 and 32/34 of the base 30 at which the welding will take place. The anvil 80 includes a support arm 82 which extends upwardly from the anvil. The anvil 80 is again free to rotate to help rotate the base 30 and the pipe 14 during the ultrasonic welding procedure, but the anvil does not move laterally.

An ultrasonic welding tool 90 is moved against the inside of the drawn area 32, and it includes a horn or head 92 which is, of course, aligned with the anvil 80. The horn 92, like the horn 52, rotates to rotate the two units being welded, as discussed above for the welding and the movement of the pipe 14. When the ultrasonic welding apparatus is engaged, the anvil 80 rotates freely and a joint area 36 ultrasonically welds the two elements, namely the pipe 14 and the base 30, together to form the pipe jack 40. The pipe jack 40 rotates by the rotation of the horn 92 until the joint area 36 is completed about the entire circumferential area of the pipe 14. As indicated above, a completed pipe jack 40 results. FIG. 8 is a side view schematically illustrating the complete pipe jack 40.

Figure 9:
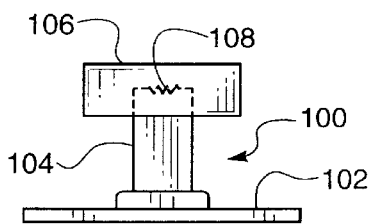
FIG. 9 is a side view illustrating another product made by the present invention.

A tee top roof flashing unit 100 is shown in FIG. 9. FIG. 9 is a side view of the tee top roof flashing unit 100. The tee top unit 100 includes a base plate 102, which is substantially identical to the base plate 30 of the pipe jack 40. The tee top 100 includes a pipe 104 which is fabricated substantially the same way as discussed above for the pipe 14, although the pipe 104 is substantially larger in diameter than that of the pipe 14. The securing of the pipe 104 to the base 102 is substantially as discussed above, and as illustrated in FIGS. 5, 6, and 7.

A top 106 is a substantially rectangular plate curved in the configuration of a half cylindrical element and is ultrasonically welded to the top of the pipe 114 at two relatively short arcuate areas diametrically opposed to each other. One of the two ultrasonic welding areas is denoted by reference numeral 108.

Figure 10:
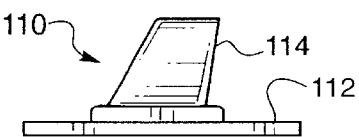
FIG. 10 is a side view showing still another product made by the method of the present invention.

It will be understood that the ultrasonic welding method discussed above may also be used, as indicated above, to produce a pipe flashing 110, a side view of which is shown in FIG. 10. The pipe flashing unit 110 includes a base 112, which is substantially identical to the base 30 and to the base 102. The pipe flashing unit 110 also includes a pipe 114 which is different in configuration from the pipe 14 of the pipe flashing 40 and the pipe 104 of the tee top unit 100. The pipe 114 is a tapered pipe, but is secured together in substantially the same way, with respect to the ultrasonic welding, as is the pipe 14 and the pipe 104, discussed above.

Figure 11:
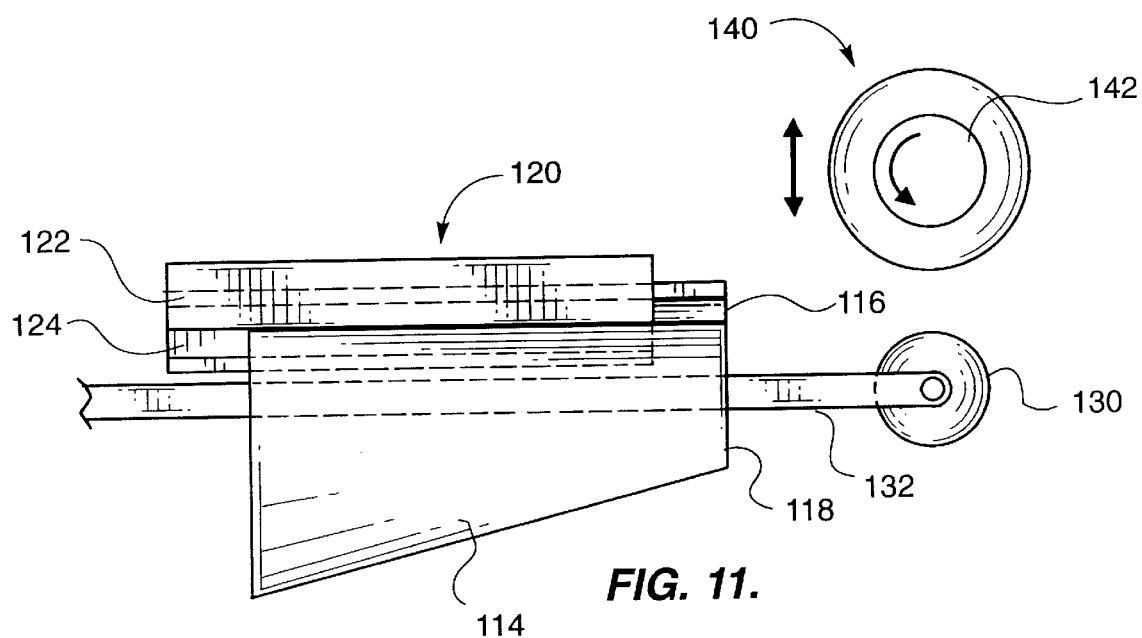
FIG. 11 is a side view illustrating a portion of the apparatus used in the method of making the product of FIG. 10.
Figure 12:
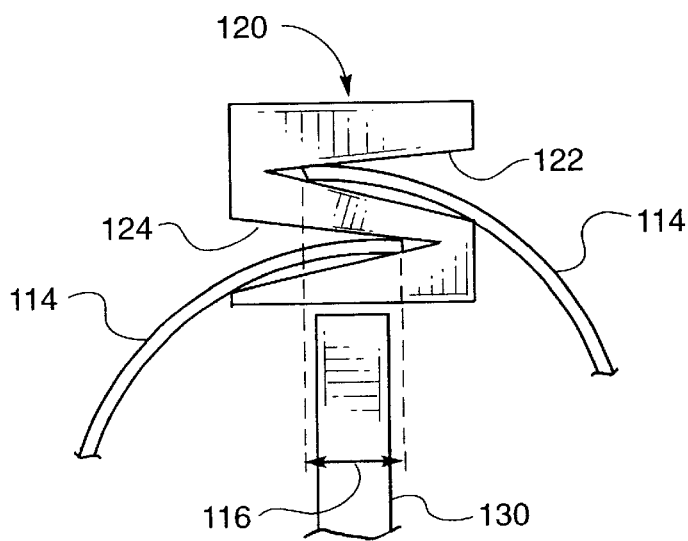
FIG. 12 is a front view of the apparatus of FIG. 11.

The manufacturing of the pipe 114 is schematically illustrated in FIGS. 11 and 12. FIG. 11 is a side view of the apparatus used to ultrasonically weld the pipe 114, while FIG. 12 is a schematic representation of the front view of a portion of the elements illustrated in FIG. 11. For the following discussion, reference will primarily be made to FIGS. 11 and 12, but reference may also be made to FIG. 10.

A split sleeve 120 is illustrated in both FIGS. 11 and 12, and the split sleeve 120 is used to hold the tapered pipe 114 after it has been rolled and prior to, and during, the ultrasonic welding step. The split sleeve 120 includes a pair of generally vee shaped slots 122 and 124 into which the opposite sides of the tapered pipe 114 are inserted. The sleeve 120 is spaced apart slightly from an anvil 130, which is supported by a support arm 132. As indicated above, the anvil 130, like the anvils 52 and 80, rotate freely.

Disposed above the anvil 130, and aligned therewith, is a ultrasonic welding tool 140 with its horn 142. As indicated by the double headed arrow, the ultrasonic welding tool moves upwardly and downwardly. As indicated by the heavy single headed arrow, the horn 142 rotates as the ultrasonic welding tool 140 is activated to accomplish the ultrasonic welding.

It is the rotation of the horn 142, as well as the rotation of the horns 62 and 92, discussed above, that causes the elements being welded to move, thus providing a continuous welded area.

An overlap area of the ends of the rolled pipe 114 is indicated by reference number 116 in both FIG. 11 and FIG. 12. The ultrasonic welding takes place in the overlap area 116.

An outer end 118 of the rolled sleeve 114 is manually placed or moved onto the anvil 130, and the ultrasonic welding tool 140 is then moved downwardly to clamp the pipe 114 against the anvil 130 at the overlap area 116. The ultrasonic welding tool 140 is then actuated to both accomplish the welding step and to rotate the horn 142 to move the pipe 114 along its full length to provide a continuous bead the full length of the horn 114.

It will be noted that using a split sleeve 120, the angle or size of the pipe 114 is entirely immaterial.

It will be noted that the anvil 130 is shown in FIG. 12 spaced apart downwardly from the split sleeve 120. The purpose of this is for clarity of illustration. In actuality, as may be understood from FIG. 11, the height of the anvil 130, while spaced in front of the sleeve 120, is sufficient to easily allow the pipe 114 to move onto the anvil 130.

The joint area of the pipe 114 and the base 112 is rendered generally perpendicularly to the plane of the base 102, substantially as discussed above, by a swaging operation, also as discussed above. Thus, the joint area of the two elements is substantially as shown in FIG. 6, and is formed in substantially the same way as illustrated in FIG. 5. The taper of the pipe 114 is relatively immaterial with respect to the ultrasonic welding steps as outlined above.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. A method for ultrasonically welding roof flashing unit comprising in combination:

providing a first plate;

punching a center hole in the first plate;

drawing a portion of the first plate upwardly about the punched center hole;

providing a second plate;

curving the second plate into a generally cylindrical configuration including an overlap area;

providing a first ultrasonic welding unit;

ultrasonically welding the curved second plate in the overlap area to secure the pipe to the first plate to provide a roof flashing unit.

2. The method of claim 1 which further includes the steps of providing a sleeve adjacent to the first ultrasonic welding unit.

3. The method of claim 2 which further includes the step of inserting the curved second plate into the sleeve prior to ultrasonically welding the curved second plate.

4. The method of claim 3 in which the sleeve is a generally cylindrical sleeve.

5. The method of claim 3 in which the sleeve is a split sleeve.

6. The method of claim 1 in which the step of providing the first ultrasonic welding unit includes the step of generally horizontally disposing the first ultrasonic welding unit.

7. The method of claim 6 in which the step of providing the second ultrasonic welding unit includes the step of generally vertically disposing the second ultrasonic welding unit.

8. The method of claim 1 which further includes the steps of providing a third plate;

bending the third plate into a generally half cylindrical configuration;

ultrasonically welding the bent third plate to the pipe remote from the first plate to define another roof flashing unit.

9. The method of claim 1 in which the step of curving the second plate into a generally cylindrical configuration includes the step of providing a taper to the generally cylindrical configuration to provide still another roof flashing unit.

10. Apparatus for ultrasonically welding roof flashing units comprising in combination:

a first ultrasonic welding means including a first anvil against which a rolled pipe is disposed and a first welding unit having a horn for ultrasonically welding the rolled pipe;

sleeve means disposed adjacent to the first anvil for holding the rolled pipe as the pipe is ultrasonically welded; and a second ultrasonic welding means, including a second anvil against which the welded pipe and a base element are disposed and a second welding unit for ultrasonically welding the welded pipe to the base element.

11. The apparatus of claim 10 in which the sleeve means comprises a cylindrical for holding a generally cylindrical rolled pipe.

12. The apparatus of claim 10 in which the sleeve means comprises a split sleeve having a first slot and a second slot for holding a tapered rolled pipe.

13. The apparatus of claim 10 in which the first anvil is rotable for moving the rolled pipe as the rolled pipe is welded.

14. The apparatus of claim 13 in which the second anvil is rotable for moving the welded pipe and the base element as they are welded.

* * * * *